Oct. 23, 1956

A. RINGEN ET AL 2,767,963

PORTABLE FEED MIXER AND UNLOADER

Filed March 9, 1956

INVENTORS
ALBERT RINGEN
HAROLD SWEEN
BY
Merchant & Merchant
ATTORNEYS

Oct. 23, 1956  A. RINGEN ET AL  2,767,963
PORTABLE FEED MIXER AND UNLOADER
Filed March 9, 1956  2 Sheets-Sheet 2
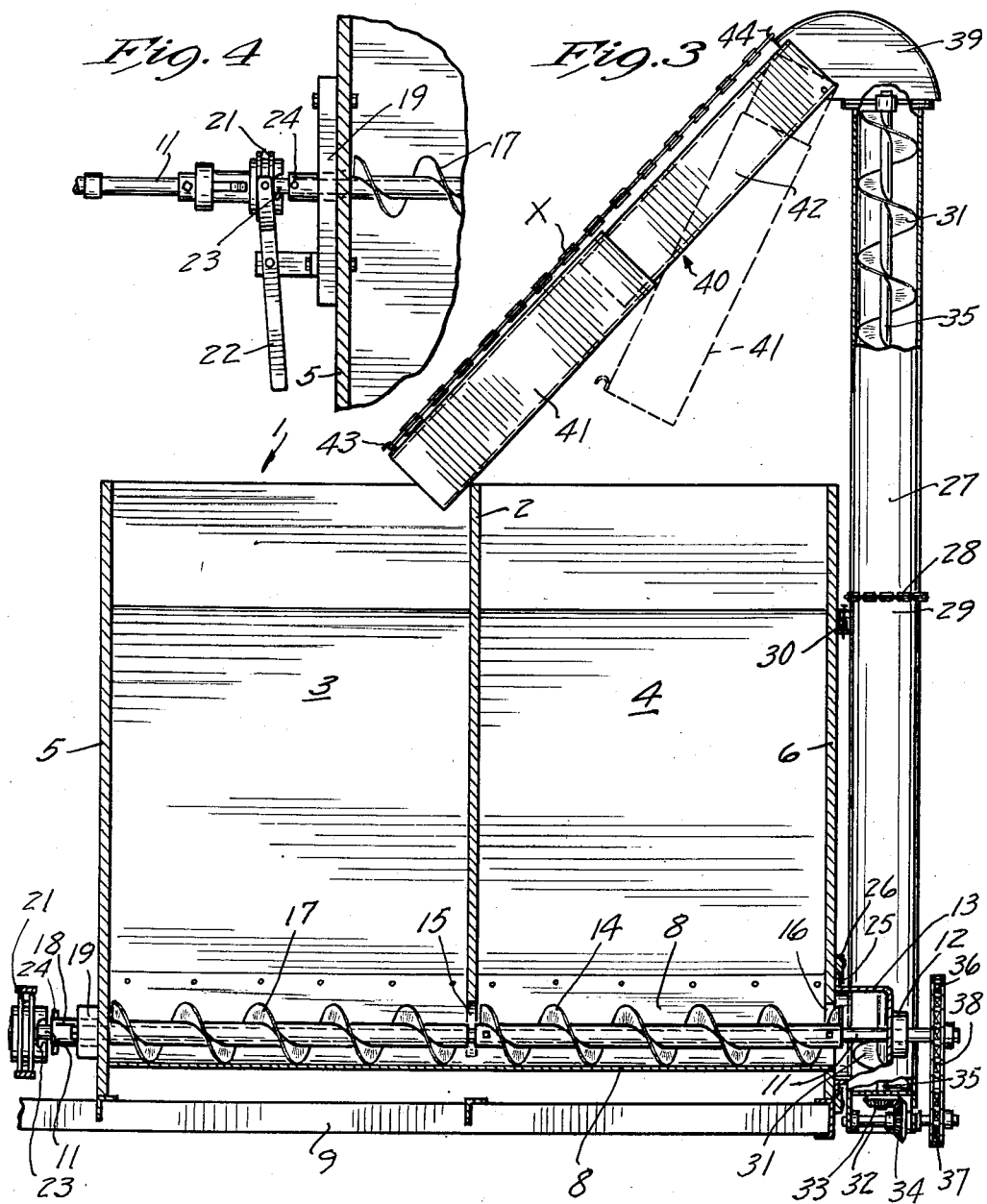
INVENTORS
ALBERT RINGEN
HAROLD SWEEN
BY
ATTORNEYS

United States Patent Office 2,767,963
Patented Oct. 23, 1956

2,767,963

PORTABLE FEED MIXER AND UNLOADER

Albert Ringen and Harold Sween, Racine, Minn.

Application March 9, 1956, Serial No. 570,534

4 Claims. (Cl. 259—10)

My invention relates generally to farm vehicles and more specifically provides a novel and improved portable feed mixer and unloader.

The primary object of my invention is the provision of a novel portable vehicle which is divided into a plurality of compartments and is provided with a novel arrangement of conveyors, elevator and delivery spout whereby unmixed granular feed such as protein and antibiotics and grain may be placed in one of said bins and quickly removed therefrom into another bin—and the material so partially mixed finally returned to the original bin in a completely mixed condition by selective operation of the conveyor and spout mechanisms.

A further object of my invention is the provision of a device in the class described which may be efficiently operated from the power takeoff of a conventional agricultural tractor.

A still further object of my invention is the provision of a device in the class described which is relatively inexpensive to produce, has a minimum of working parts, and is extremely durable.

A further object of my invention is the provision of a novel portable feed mixer and unloader which is light in weight, and hence, easy to transport and which is extremely easy to operate.

The above and still further objects of my invention will become apparent from the following detailed specification, appended claims, and attached drawings.

Referring to the drawings, wherein like characters indicate like parts throughout the several views:

Fig. 3 is an enlarged view partly in vertical section and partly in side elevation as seen substantially from the line 3—3 of Fig. 2; and Fig. 4 is an enlarged fragmentary view as substantially seen from line 4—4 of Fig. 1.

Figure 1:
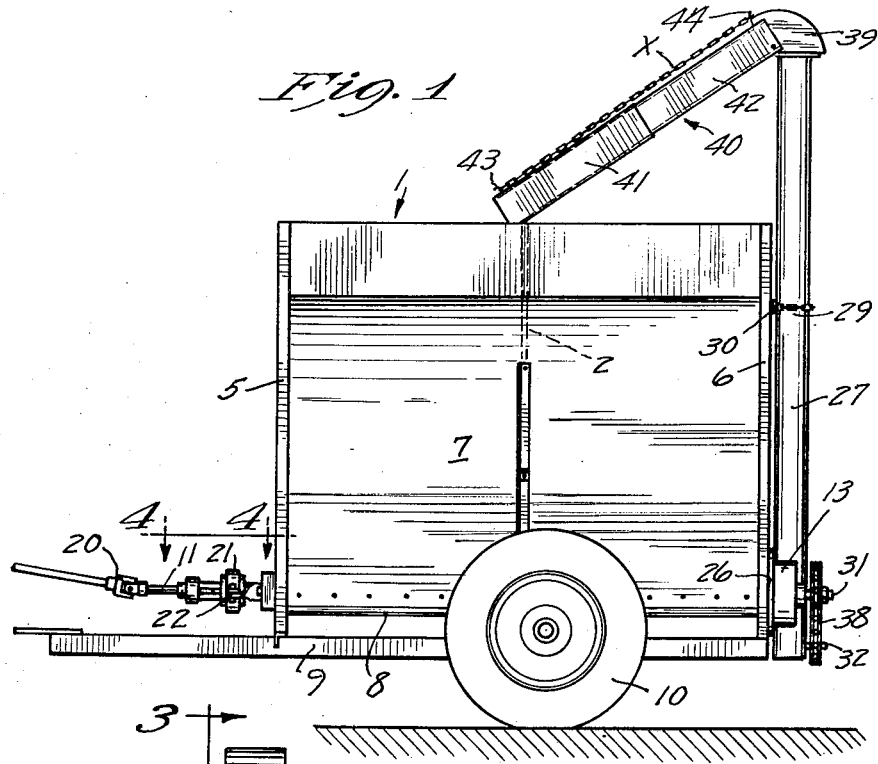
Fig. 1 is a view in side elevation of my novel structure.

Referring with greater particularity to the drawings, the numeral 1 indicates in its entirety a hopper-like box having a transversely extended partition 2 dividing same into front and rear compartments 3 and 4 respectively. The front wall of the box 1 is identified by the numeral 5, the rear wall thereof by the numeral 6. The converging side walls 7 have secured therebetween a V-shaped bottom 8 preferably formed from sheet steel or the like. Box 1, as shown, is mounted upon a suitable frame 9 which in turn is equipped with conventional wheels 10, preferably and as shown, being equipped with pneumatic tires.

Drive shaft 11 extends axially through the box 1 in closely spaced relation to the bottom 8. Drive shaft 11 has its front end journalled in the front wall 5 whereas the rear end thereof is journalled as at 12 in a housing 13 secured to the outer surface of the rear wall 6. A screw conveyor 14 is fast upon the drive shaft 11 within the rear compartment 4 and feeds from a point immediately adjacent an opening 15 in the partition 2, through an aligned opening 16 in the rear wall 6, whereby to deliver granular feed thereby into the housing 13.

A screw conveyor 17 is rotatably mounted on the drive shaft 11 within the front compartment 3 and feeds from a point immediately adjacent the front wall 5 to a point immediately adjacent the opening 15 in the partition 2. At its forward end, the conveyor 17 terminates in a tubular drive collar 18 which is journalled in a bearing 19 carried by the front wall 5. The front end of the drive shaft 11, as shown in Fig. 3, is journalled within the drive collar 18 and projects forwardly thereof where it is provided, as at 20, with means for detachably coupling same to the power takeoff of a conventional tractor. Intermediate the drive collar 18 and the power takeoff connection 20, a conventional sliding dog-type clutch 21 is provided. As there shown, forward movements of the operating handle 22 will cause the jaws 23 of the clutch 21 to engage pins 24 projecting radially outwardly from the drive collar 18 at a diametrically spaced point.

By the above described mechanism it should be obvious that the operator may impart rotary feeding movements only to the conveyor within the rear compartment 4 or—simultaneously impart rotary feeding movements to said conveyor 14 and conveyor 17 in front compartment 3. In any event the granular material within the rear compartment 4 or the front and rear compartments 3 and 4 will be fed into the housing 13.

Figure 2:
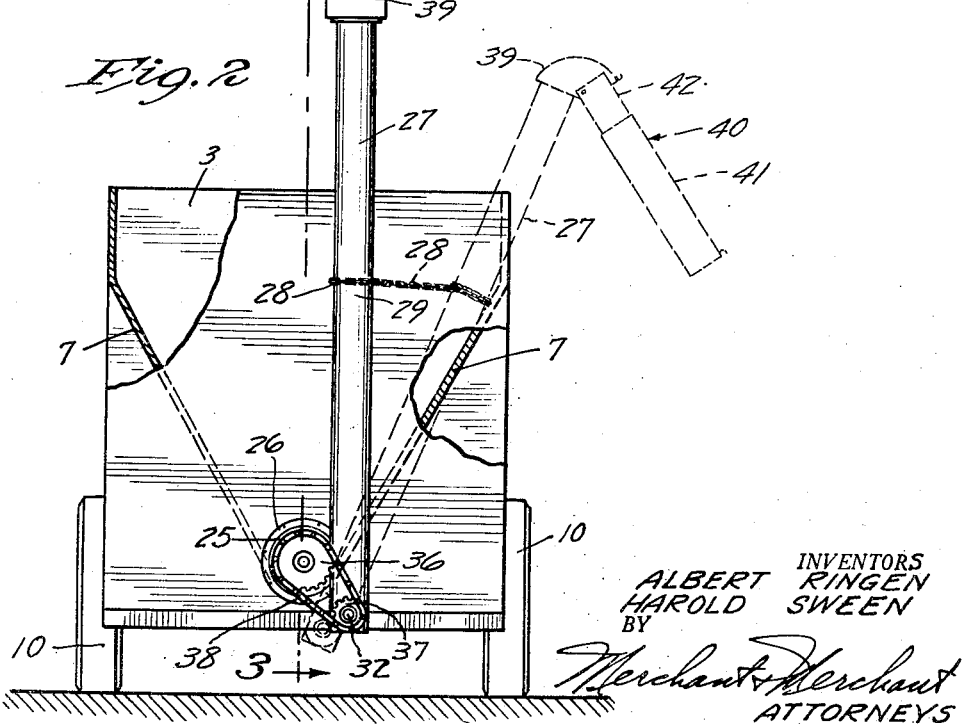
Fig. 2 is a view in end elevation as seen from the rear, some parts being broken away and some parts being shown in section.

As shown particularly in Figs. 2 and 3, the housing 13 includes a circumferentially extended continuous flange 25 which is journalled for rotation within an annular clamping ring 26 which in turn is secured to the rear surface of rear wall 6. A tubular boot 27 is connected to and communicates with the interior of the housing 13 at its lower end as shown at Fig. 3, in laterally offset relationship to the drive shaft 11. Boot 27 terminates below said drive shaft 11, whereby granular material fed into the housing 13 by conveyor 14 will, under the action of gravity, be caused to enter into the lower end of said boot 27. Boot 27 extends generally upright, but is movable from the vertically disposed full line position of Fig. 2 to the dotted line position thereof, about the axis of the drive shaft 11, about which the housing 13 is mounted for pivotal movements as above described.

Means in the nature of chain 28 encompassing the intermediate portion of the boot 29, and an anchoring clevis 30 on the rear wall 6, is provided to lock the boot 27 in either the vertically disposed full line position, or the dotted line position of Fig. 2 for purposes which will hereinafter be explained more fully.

Elevator means in the nature of a screw conveyor 31 extends the length of the boot 27. Means for imparting feeding movements to the screw conveyor 31 includes a driven shaft 32 mounted for rotation on the housing 13 in laterally spaced parallel relationship to the drive shaft 11, cooperating bevel gears 33 and 34 respectively mounted fast on the shaft 35 of the conveyor 31 and the driven shaft 32, and a pair of cooperating gears 36 and 37, the former located on the rearwardly projected end of the drive shaft 11 and the latter on the rearwardly projected end of the driven shaft 32. A chain 38 runs over gears 36, 37. By this means it should be obvious that granular material fed into the housing 13 by the conveyor 14, will be elevated to the top of the boot 27, irrespective whether said boot is in the full line or dotted line position of Fig. 2.

At its top the boot 27 is provided with a rotatable tubular head 39 which feeds into a delivery spout 40, preferably and shown comprising a pair of telescoping tubular sections 41 and 42. Section 41 and head 39 are provided with opposed hooks 43 and 44 respective between which a tie member in the form of a chain X may be interposed for purposes of locking said sections 41, 42 in their extended full line position of Fig. 3 whereby to feed only into the forward compartment 3—or alternatively, to lock said sections 41, 42 in the retracted dotted line position to deliver granular material solely to the rear compartment 4. However, in the event that the operator desires to deliver the contents of the box to a bin or feed trough laterally disposed with respect to the box 1, this may be accomplished, as above indicated by removing the chain 28 from the clevis 30 pivoting the boot 27 about the axis of the drive shaft 36 to the dotted line position of Fig. 2, and thereafter rotating the head 39 to cause delivery spout 40 to feed at right angles of the longitudinal axis of the box 1.

While we have disclosed a preferred embodiment of our invention, it should be obvious that same is capable of modification from the scope of the appended claims.

What we claim is:

1. A portable hopper-like box having a transversely extended partition dividing same into front and rear compartments, a drive shaft extending axially through said box in closely spaced relationship to the hopper-like bottom thereof and having its opposite ends journalled respectively in the front and rear walls of said box, a screw conveyor on said drive shaft within said rear compartment and extending from a point adjacent an opening in said partition connecting said rear compartment to said front compartment to a point adjacent an opening in the rear wall of said box, a screw conveyor rotatably mounted on said drive shaft within said front compartment and feeding from a point adjacent said front wall to a point adjacent said opening in said partition, said last mentioned screw conveyor terminating at its front end in a drive collar extending through said front wall of said box, clutch means on the forward ends of said drive shaft and drive collar for selectively imparting rotary movements only to said drive shaft or simultaneously to said drive shaft and said drive collar whereby to alternatively impart feeding movements only to the conveyor in said rear compartment toward the opening in said rear wall of said box or simultaneously to impart feeding movements to each of said conveyors with the conveyor in said front compartment feeding to the conveyor in the rear compartment through the opening in said partition, a housing mounted for rotation about the axis of the rear end of said drive shaft exteriorly of said box and receiving material from the conveyor within said rear compartment, a tubular boot connected to and communicating with the interior of said housing for pivotal movements therewith in laterally offset relationship to said drive shaft and terminating in a horizontal plane therebelow whereby material in said housing will be caused to enter into the lower end of said boot under the action of gravity, elevator means in said boot, an extensible and retractable delivery spout on the upper end of said boot capable of alternatively delivering into either of said front or rear compartments, and means for imparting feeding movements to said elevator means.

2. The structure defined in claim 1 in further combination with means for locking said delivery spout in its extended and retracted positions, and means imparting swinging movements to said spout in a plane at right angles to said boot.

3. The structure defined in claim 2 in further combination with means for locking said boot in a vertically disposed position for feeding granular material through said spout to said box, or alternatively, in an outwardly and downwardly pivoted position to deliver granular material from said spout laterally of said box.

4. The structure defined in claim 1 in which said elevator means comprises a screw conveyor and in which said means for imparting feeding movements to the elevator means in said boot includes driven shaft mounted for rotation in said housing in parallel relationship to said drive shaft, means connecting said shafts together for common rotation, and means on said driven shaft and the lower end portion of said screw conveyor imparting common rotation thereto.

References Cited in the file of this patent

UNITED STATES PATENTS

| 269,747 | Smith | Sept. 13, 1887 |
| 1,563,101 | Offenhauser | Nov. 24, 1925 |
| 1,720,360 | Haines | July 9, 1929 |